June 16, 1964     R. E. RASMUSSEN     3,137,466
ENGINE MOUNT

Filed May 23, 1962     2 Sheets-Sheet 1

INVENTOR.
Richard E. Rasmussen
BY
E. W. Christen
ATTORNEY

June 16, 1964 R. E. RASMUSSEN 3,137,466
ENGINE MOUNT
Filed May 23, 1962 2 Sheets-Sheet 2
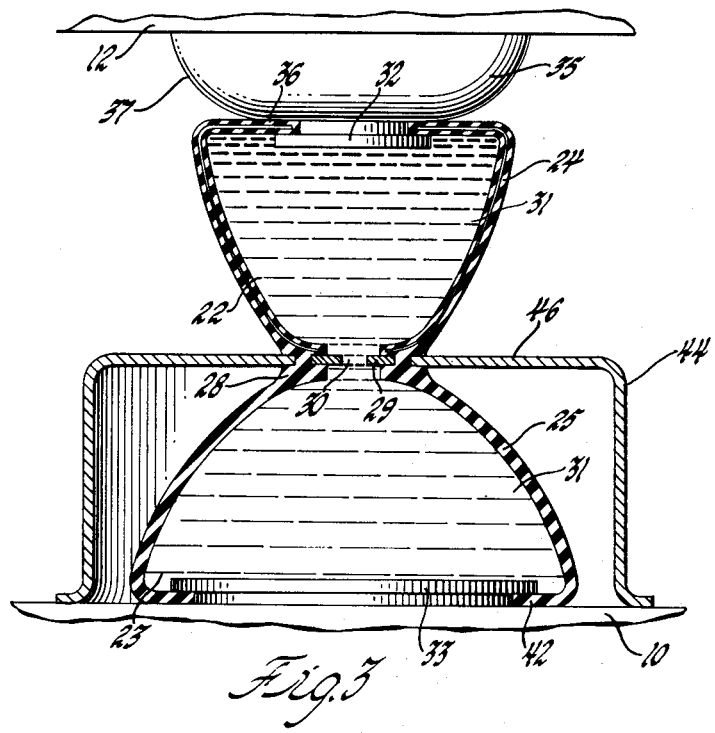
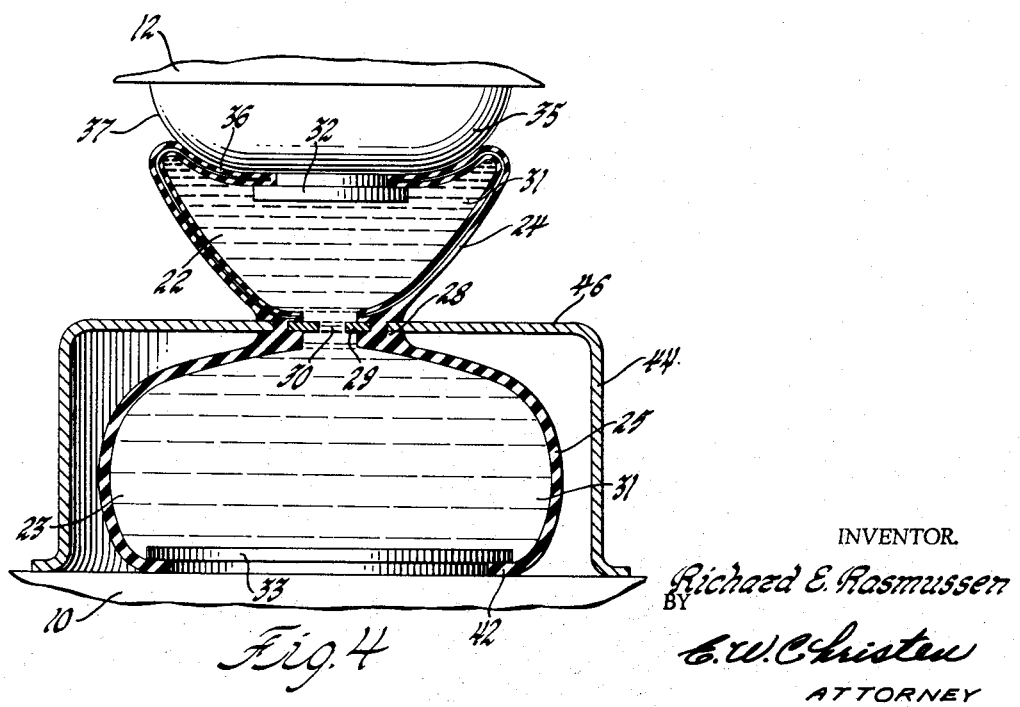
INVENTOR.
Richard E. Rasmussen
BY
E.W. Christen
ATTORNEY

United States Patent Office 3,137,466
Patented June 16, 1964

3,137,466
ENGINE MOUNT
Richard E. Rasmussen, Warren, Mich., assignor to General Motors Corporation, Detroit, Mich., a corporation of Delaware
Filed May 23, 1962, Ser. No. 196,939
6 Claims. (Cl. 248—9)

This invention relates to mounts for flexibly supported machinery subject to shock and vibration, and more particularly to a mount utilizing hydraulic damping and polymer elastic response to absorb vibrational energy.

A good example of the use of such a mount is an engine support where a plurality of such mounts are positioned between a vehicle frame and an engine block. Conventional engine mounts are made of solid rubber of various shapes, the shape and type of rubber determines the spring rate of the mount and, therefore, to some extent its vibration isolation characteristics. An inertia member imbedded in the rubber damps by subjecting the rubber to shear. The inherent damping of these devices is very low and controlled only to a very limited extent by the type of rubber employed.

Still other mounts employ a different damping principle. In the absorption damped mount the vibrational energy is absorbed or converted into heat by pumping a hydraulic fluid through a restricted orifice as in the piston type shock absorber. Greater damping is achieved over what was possible with the solid rubber mounts.

In other cases, a combination of solid rubber and hydraulically damped mounting is employed where the rubber body is bonded to a metallic base and is placed in shear to attenuate resonate vibration, but acting jointly with the rubber is a hydraulic damping system whereby shock type impulses are better absorbed. Energy of vibration is converted to heat partly in the walls of the resilient body and partly by the pumping action of the hydraulic damping system.

At times it may be desirable to incorporate much more damping than is available in these rubber compounds even when assisted by hydraulic damping. Also, the rubber is subject to deterioration and developes cracks which migrate under loading conditions to large fissures resulting in failure.

The present invention employs the maximum absorption damping characteristics of the piston type shock absorber with the inherent elastic spring responsive nature of rubber or rubber-like materials. Rubber in shear is eliminated.

In accordance with the present invention, I have invented a mount adapted to be positioned between a supported mass and a supporting mass including a hollow flexible bladder connectable between the supported and supporting masses and characterized by having an elastic and an inelastic wall portion, partition means formed between the elastic and inelastic wall portions to provide a pair of chambers in the bladder, flow restrictor passage means formed in said partition means to provide communication between the chambers, one of the chambers being outwardly bound by the elastic wall portion and the other chamber being outwardly bound by the inelastic wall portion, and a liquid medium substantially filling the chambers whereby forces transmitted between the supported and supporting masses by the medium are absorbed according to the combined effects of pumping the medium through the passage means and the elastic response of the elastic wall portion.

A more detailed description of my inventive construction may be more fully understood in reference to the drawings wherein:

FIGURE 3 is a modification where a separate midriff support is employed; and

Figure 1:
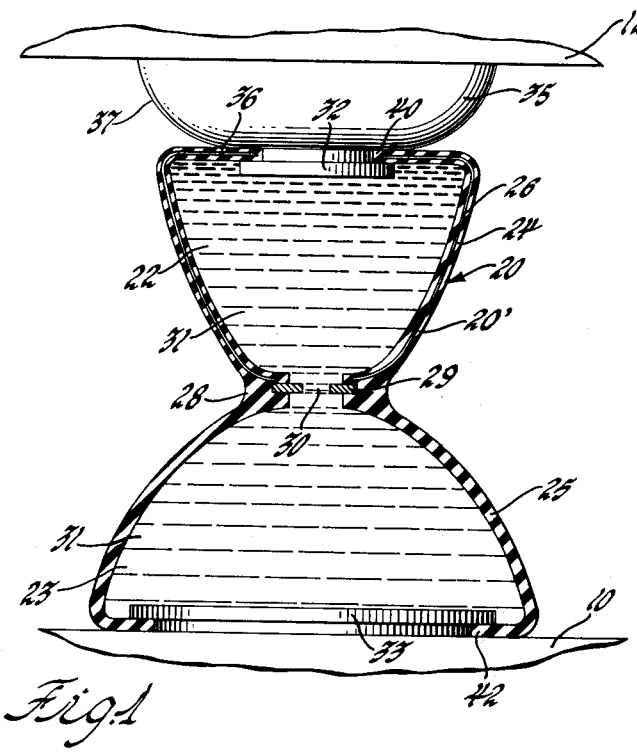
FIGURE 1 illustrates a cross section of the mount in a static condition.
Figure 2:
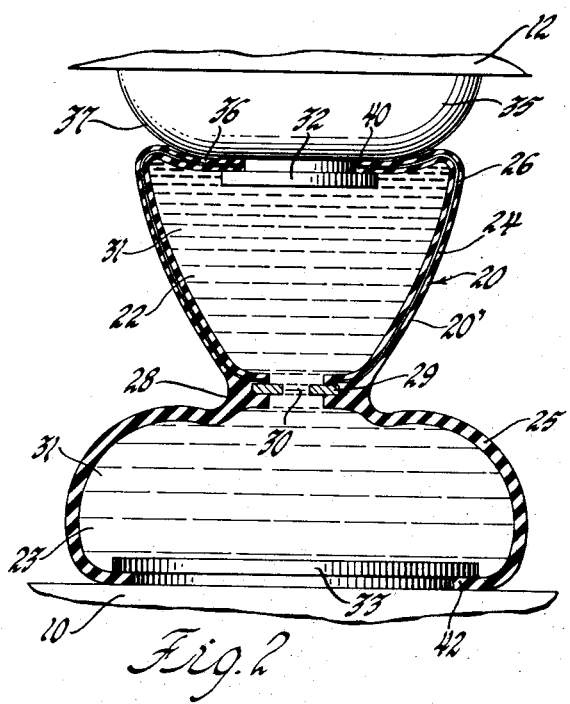
FIGURE 2 shows the mount of FIGURE 1 under dynamic conditions.

FIGURE 4 ilustrates the mount in FIGURE 3 under dynamic conditions.

The mount 20 includes a hollow bladder or bag 20' of thin wall section positioned between a supported mass 12 and a supporting mass 10 which may be a machine frame or engine block in the case of the former, or a floor or vehicle frame in the case of the latter. The bladder has a continuous upper and lower wall portion 24 and 25 extending between the supported and the supporting masses and secured thereto by mounting plates 32 and 33. The upper wall portion 24 is of rubber, or the like, but is reinforced with a fabric or other inelastic but flexible material 26 molded in the walls to render them inelastic and capable of resisting expansion forces for a purpose hereinafter described. The lower wall portion 25 is made of similar rubber material but is not reinforced and is elastically expandable. A midriff portion 28 is formed between the upper and lower wall portions providing an upper chamber 22 and a lower chamber 23. The midriff portion or partition 28 constrains the upper and lower wall portions into a smaller waist region roughly at the mid-section of bladder 20' thus generally conforming to an hourglass shape. An orifice plate 29 mounted in the midriff portion 28 provides communication between chambers 22 and 23 through orifice or restricted passage means 30. The ends 40 and 42 of upper and lower wall portions 24 and 25 are open but are sealed and respectively secured to the supported and supporting masses by mounting plates 32 and 33. A suitable liquid medium 31, such as oil, water or the like, substantially fills both chambers 22 and 23. The bladder hence forms a liquid tight dual chambered mount body. Pressure button 35 having a convex surface 37 is mounted by any suitable means on the supported mass 12 for vertical movement therewith and serves as a deforming head for the ceiling 36 of the upper wall portion 24. The upper mounting plate 32 is attached to the pressure button 35 while the lower plate 33 is stationary on the supporting mass 10.

Small amplitude vibrations of the supported mass 12 will produce a slight downward deflection of the ceiling 36, causing it to conform in a rolling contact fashion to the surface of the pressure button 35. Since the upper wall portion is flexible but inelastic due to the reinforcing material 26 in the walls, the change in volume in the upper chamber 22 causes a quantity of liquid medium 31 to flow through the orifice 30 into lower chamber 23. The increase in volume in the lower chamber 23 is permitted since the lower wall portion 25 is elastic. The physical restriction by the passage 30 on the free flow of the hydraulic fluid dampens the excited mass 12 since the work done in pumping the fluid from the upper to lower chambers equals in part the energy of vibration.

Further, damping occurs simultaneously with the hydraulic damping since the lower wall portion 25 is elastic. An increase in pressure at one point in a confined fluid results in a like increase in pressure at every other point in the fluid. This principle operates to cause the elastic walls of the lower chamber to stretch or bulge outwardly in uniform fashion. Hence, the polymer characteristics of the elastic walls govern the amount of work required to stretch them and further dampen the energy of vibrations of the supported mass. Obviously, the decrease in volume of the upper chamber 22 is accompanied by a corresponding increase of equal volume in the lower chamber 23.

The mount also acts as a spring because once the deflection producing forces are absorbed, the energy stored in the elastic walls of the lower chamber causes an upward force to act on the ceiling 36 through the liquid medium thus tending to restore the former position of the supported mass. Hence, periodic deflections of the ceiling 36 caused by the amplitudinal oscillation of the supported mass are accompanied by a reversible fluid flow through the orifice 30.

The hourglass shape of the mounting 20 is preferred. The upper chamber 22 is smaller than lower chamber 23. The smaller chamber walls then define a path of vertical movement within a major boundary circumscribed by the lower chamber walls. This construction aids in bulging or stretching the lower wall portions 25 as well as giving the mount better balance.

In the event that a large amount of damping is desired where heavy shocks are encountered, the construction shown in FIGURES 3 and 4 is employed. A cylindrical deflection support 44 having a radial flange 46 is provided to rigidly support the orifice plate 29 and the midriff section 28 from the supporting mass 10 so that the upper chamber 22 cannot deflect downwardly. Otherwise, in the case where critical or supercritical damping is encountered, the beneficial pumping effect would be reduced since the tendency to stretch the elastic walls by a downward movement of the upper chamber would be much greater than the tendency to displace liquid from the upper chamber through the restriction 30.

To change the damping characteristics and spring rate of the mount, differing materials may be used for the lower wall portion 25, such as natural rubber, or Neoprene for example. Further, the orifice diameter may be varied to restrict or enlarge the path of flow between the two chambers, or the fluid medium may be changed from a liquid of low viscosity to high viscosity. The upper chamber walls 24 may be of any inelastic flexible material, such as fabrically reinforced rubber or plastic.

Having now described the invention and the best mode contemplated of carrying it out, it will be apparent that slight variations in construction may be made without departing from the spirit of the invention or the scope of the appended claims.

What is claimed is:

1. An engine mount adapted to be positioned between an engine and vehicle frame comprising:
    a hollow flexible bladder connectable between said engine and frame and characterized by having an elastic and an inelastic wall portion;
    partition means formed between said elastic and inelastic wall portions to provide a pair of chambers in said bladder;
    flow restrictor passage means formed in said partition means to provide communication betwen said chambers, one of said chambers being outwardly bound by said elastic wall portion and the other chamber being outwardly bound by said inelastic wall portion; and
    a liquid medium substantially filling said chambers whereby forces transmitted between said engine and frame by said medium are absorbed according to the combined effect of pumping said medium through said passage means and the elastic response of said elastic wall portion.

2. An engine mount as described in claim 1 and in addition including a deflection support means for rigidly supporting said partition means from said frame.

3. An engine mount adapted to be positioned between an engine and a vehicle frame comprising a flexible hollow bladder of thin wall section, the upper portion of said bladder being formed of an inelastic material and the lower portion being formed of an elastic material;
    attaching means for securing the opposite ends of said bladder to said engine and frame;
    a midriff portion formed between said upper and lower portions providing a pair of chambers in said bladder;
    a damping orifice formed in said midriff portion providing fluid communication between said chambers; and
    a liquid medium substantially filling said chambers whereby forces transmitted between said engine and frame by said medium are absorbed according to the combined effect of pumping said medium through said orifice and the elastic response of said lower portion.

4. A hydraulically damped engine mount adapted to be positioned between an engine and a vehicle frame including:
    a flexible bladder of thin wall section extending between said engine and frame and having an hourglass conformation describing an enlarged upper portion and an enlarged lower portion separated by a narrowed waist portion, said lower portion being formed of an elastic material;
    a pair of chambers in said bladder bounded by said upper and low portions as defined by said waist portion;
    reinforcing means associated with said upper portion to render same inelastic and capable of resisting expansion forces without rupture;
    attaching means providing connection between the opposite ends of said bladder and said engine and frame;
    a damping orifice formed in said waist portion providing fluid communication between said chambers;
    a liquid medium substantially filling said chambers; and
    a deflection support rigidly supporting said waist portion from said frame whereby forces transmitted between said engine and frame by said liquid medium are absorbed according to the combined effect of pumping said medium through said orifice and the elastic response of said lower portion.

5. The device as described in claim 4 wherein said attaching means comprises:
    a pressure button having a convex surface mounted on said engine;
    a mounting plate attached to said convex surface for mounting one end of said bladder, said end positionable against said convex surface; and
    a second mounting plate attached to said frame for mounting the other end of said bladder whereby amplitudinal oscillations of said engine cause said pressure button to deform said one end upon said convex surface.

6. The device as described in claim 4 wherein said upper chamber is smaller than said lower chamber.

References Cited in the file of this patent

UNITED STATES PATENTS

| 1,884,477 | Wood | Oct. 25, 1932 |
| 2,540,130 | Lee | Feb. 6, 1951 |
| 2,773,686 | Nash | Dec. 11, 1956 |
| 3,038,717 | Bank | June 12, 1962 |

FOREIGN PATENTS

| 258,893 | Great Britain | Apr. 14, 1927 |